United States Patent
Sabah et al.

(10) Patent No.: US 10,843,257 B2
(45) Date of Patent: Nov. 24, 2020

(54) METHOD FOR MANUFACTURING A PART OUT OF A METAL MATRIX COMPOSITE MATERIAL, AND RELATED DEVICE

(71) Applicants: Safran Electronics & Defense, Boulogne-Billancourt (FR); SAFRAN, Paris (FR)

(72) Inventors: Muriel Sabah, Boulogne-Billancourt (FR); Nicolas Maisonnave, Paris (FR)

(73) Assignees: SAFRAN ELECTRONICS AND DEFENSE, Boulogne-Billancourt (FR); SAFRAN, Paris (FR)

(*) Notice: Subject to any disclaimer, the term of this patent is extended or adjusted under 35 U.S.C. 154(b) by 482 days.

(21) Appl. No.: 15/315,674

(22) PCT Filed: Jun. 2, 2015

(86) PCT No.: PCT/EP2015/062305
§ 371 (c)(1),
(2) Date: Dec. 1, 2016

(87) PCT Pub. No.: WO2015/185578
PCT Pub. Date: Dec. 10, 2015

(65) Prior Publication Data
US 2017/0216911 A1   Aug. 3, 2017

(30) Foreign Application Priority Data
Jun. 3, 2014 (FR) ..................... 14 55038

(51) Int. Cl.
*B22D 19/02* (2006.01)
*B22D 19/14* (2006.01)
(Continued)

(52) U.S. Cl.
CPC ............ *B22D 19/02* (2013.01); *B22C 9/06* (2013.01); *B22C 9/22* (2013.01); *B22D 17/2227* (2013.01);
(Continued)

(58) Field of Classification Search
CPC ......... B22C 9/06; B22C 9/22; B22D 17/2227; B22D 18/02; B22D 18/06; B22D 19/02;
(Continued)

(56) References Cited

U.S. PATENT DOCUMENTS

| 4,653,569 A | 3/1987 | Tank et al. |
| 4,828,460 A * | 5/1989 | Saito et al. ............ B22D 17/30 417/50 |
| 2012/0177501 A1 * | 7/2012 | Cairo et al. ............ B22D 19/14 416/230 |

FOREIGN PATENT DOCUMENTS

| DE | 10 2012 011264 A1 | 12/2013 |
| EP | 0 164 536 A2 | 12/1985 |

(Continued)

OTHER PUBLICATIONS

International Search Report in PCT/EP2015/062305 dated Aug. 28, 2015, with English translation. 8 pages.
(Continued)

*Primary Examiner* — Kevin P Kerns
(74) *Attorney, Agent, or Firm* — Womble Bond Dickinson (US) LLP

(57) ABSTRACT

A method (S) for manufacturing a part (1) out of a metal matrix composite material, including the following steps: opening (S1) a device (10) that includes a supporting portion (14) and a molding portion (14); placing (S2) a fibrous reinforcement into the device (10); sealably closing (S3) the device (10) by providing a space between the fibrous reinforcement (2) and the device portions; feeding (S4) the
(Continued)

molten metal matrix (3) into the device (10) such as to fill the space between the fibrous reinforcement (2) and the device portions (13, 14); and applying (S5) a force onto the equipment (10) such as to impregnate the fibrous reinforcement (2) with the metal matrix (3).

10 Claims, 2 Drawing Sheets

(51) Int. Cl.
    *B22D 18/02* (2006.01)
    *B22D 18/06* (2006.01)
    *B22D 21/00* (2006.01)
    *B22D 25/06* (2006.01)
    *B22D 27/11* (2006.01)
    *B22C 9/06* (2006.01)
    *B22C 9/22* (2006.01)
    *B22D 17/22* (2006.01)
    *C22C 47/12* (2006.01)
    *C22C 49/06* (2006.01)
    *C22C 49/04* (2006.01)
    *C22C 47/06* (2006.01)
    *C22C 49/14* (2006.01)
    *B32B 5/26* (2006.01)
    *B64D 29/08* (2006.01)
    *D06M 11/83* (2006.01)

(52) U.S. Cl.
    CPC ............. *B22D 18/02* (2013.01); *B22D 18/06* (2013.01); *B22D 19/14* (2013.01); *B22D 21/007* (2013.01); *B22D 25/06* (2013.01); *B22D 27/11* (2013.01); *B32B 5/26* (2013.01); *B64D 29/08* (2013.01); *C22C 47/066* (2013.01); *C22C 47/068* (2013.01); *C22C 47/12* (2013.01); *C22C 49/04* (2013.01); *C22C 49/06* (2013.01); *C22C 49/14* (2013.01); *D06M 11/83* (2013.01); *B32B 2250/20* (2013.01); *B32B 2260/023* (2013.01); *B32B 2260/04* (2013.01); *B32B 2307/302* (2013.01); *B32B 2605/18* (2013.01)

(58) Field of Classification Search
    CPC ...... B22D 19/14; B22D 21/00; B22D 21/007; B22D 25/06; B22D 27/11
    USPC ...................................................... 164/91, 97
    See application file for complete search history.

(56) References Cited

FOREIGN PATENT DOCUMENTS

| EP | 2 474 638 A2 | 7/2012 |
|---|---|---|
| GB | 1 359 554 A | 7/1974 |
| WO | WO 2005/097377 A1 | 10/2005 |

OTHER PUBLICATIONS

Search Report in French Application No. 1455038 dated Mar. 4, 2015, with English translation coversheet. 4 pages.

\* cited by examiner

METHOD FOR MANUFACTURING A PART OUT OF A METAL MATRIX COMPOSITE MATERIAL, AND RELATED DEVICE

FIELD OF THE INVENTION

The invention relates to a manufacturing method for a part made of composite material including a fiber reinforcement densified by a metal matrix, particularly in the field of aeronautics.

TECHNOLOGICAL BACKGROUND

Today it is necessary to observe very high environmental requirements which are difficult to reconcile with requirements in terms of safety, which often involves a non-negligible increase in mass and in cost for manufacturing the parts concerned. However, it proves difficult to contemplate making parts at too high a cost, even if they have the required mechanical, thermal and electrical properties.

For example, in the field of aeronautics, avionics housings containing power electronics subjected to very severe temperature and vibration environments, which require good (mechanical, thermal and electrical) energy transmission. These housings are therefore generally made of aluminum because this material has both low density and good thermal conductivity. However, aluminum is not sufficient for removing all the heat generated by the power electronics, so that it proves necessary to equip the housing with supplementary cooling systems including cooling plates, heat sinks and/or heat pipes, which increase the overall mass of the housing and reduce drastically its efficiency in dealing with environmental constraints.

It has already been proposed to use composite materials so as to combine the advantageous properties of several different materials and improve the mass and/or the cost for manufacturing the different parts made with these materials.

For example, in the field of aeronautics, it has been proposed to make blower casings of a composite material with a fiber reinforcement densified by a polymer matrix. The parts thus obtained are both light and mechanically strong. This type of material, however, is not a conductor and has difficulty resisting severe temperature environments due to the polymer composition of the matrix. This type of composite material can therefore not be considered for manufacturing parts requiring good thermal and electrical conductivity such as avionics housings.

In the field of space flight, it has been proposed to make composite materials comprising a reinforcement densified by a metal matrix (known by the acronym C3M, for metal matrix composite materials). The metal matrix can then comprise a pure metal or an alloy, while the reinforcement can comprise fibers or open-pore foams.

So as to obtain these metal matrix composite materials, it is known to infiltrate the metal matrix under pressure in the liquid form (melted) into the reinforcement in a Hyperclave enclosure. According to this technique, a mold is placed in the enclosure including a fiber preform and a crucible containing blocks of the metal intended to form the matrix of the part. A vacuum is then created inside the enclosure and the mold, the crucible containing the metal blocks is heated and the mold is pre-heated. When the alloy contained in the crucible is completely melted, it is transferred to the inside of the mold. This transfer is carried out automatically by pressurizing the enclosure to a pressure level generally comprised between about 30 bars and about 100 bars. As soon as the mold is filled, the cooling of the part is accelerated by putting a refrigerating member in contact with a wall of the mold. As long as the temperature has not fallen below the solidification temperature of the alloy, the pressure is maintained in the container so as to compensate the natural shrinkage of the metal.

This method then allows a composite material to be obtained having great dimensional stability and excellent mechanical, thermal and electrical properties (depending on the materials selected for the fiber reinforcement and the metal matrix). It is, however, extremely complex to implement and a heavy consumer of energy, of manufacturing time and of cost, which makes it difficult to use for large-scale production outside of the space flight field.

In document EP 0 164 536, it has been proposed to manufacture an object of elongated shape comprising a composite material made of carbon fibers and a metal matrix based on magnesium. To this end, a bundle of parallel high-strength carbon fibers is introduced into an elongated enclosure made of stainless steel, pre-heated to approximately 700° C. and placed in the cavity of a foundry mold under pressure, pre-heated to approximately 200° C., so that the opening of the enclosure is oriented upward. The melted magnesium alloy is then poured into the cavity, at approximately 700° C., then a piston, also heated to approximately 200° C., is pressed to the top of the mold so as to compress the melted alloy and force it to penetrate into the bundle of fibers during cooling of the apparatus. After the piston is lifted again, the solidified part is extracted upward using a tappet. The final part is obtained by machining, during which the enclosure is eliminated.

In this document, however, the parts obtained necessarily have a main direction extending along the axis of compression of the piston. Moreover, the shape of the parts is limited due to the elongated shape and it is necessary to apply a very high force on the piston (on the order of 1500 bars) so as to infiltrate the alloy into the carbon fibers. Finally, this method requires a long and tedious machining step so as to remove the metal alloy and the steel enclosure from around the composite material thus obtained.

SUMMARY OF THE INVENTION

One goal of the invention is to propose a new metal matrix composite material which can be used, in particular in the field of aeronautics, which has better electrical and thermal performance and better density than monolithic aluminum or magnesium while still having equivalent mechanical performance, at a reasonable cost.

Another goal of the invention is to propose a part made of a new metal matrix composite material which combines the mechanical, thermal and electrical characteristics of several materials, which can be made easily and rapidly for a reasonable cost, and which can, if necessary, undergo later finishing operations such as machine and other assembly processes such as welding, riveting, etc.

To this end, the invention proposes a method for manufacturing a part out of a composite material comprising a fiber reinforcement densified by a metal matrix, for example a part for an aviation engine, the manufacturing method comprising the following steps:

opening a device comprising a support portion and a molding portion, by separating the molding portion from the support portion so as to delimit with the support portion a recess, placing a fiber reinforcement in the recess of the device, sealingly closing the device, by attaching the molding portion to the support portion and by providing a space between the fiber reinforcement and the portions of the device, melting the metal matrix, introducing the metal matrix into the device so as to fill the space between the fiber reinforcement and the portions of the device, applying a force to the molding portion and/or to the support portion so as to bring the molding portion and the support portion together and to reduce the space between the fiber reinforcement and the portions of the device, to impregnate the fiber reinforcement with the metal matrix.

Certain preferred but non-limiting characteristics of the manufacturing method described above are the following:

the support portion and/or the molding portion are pre-heated to a pre-heating temperature less than or equal to the melting temperature of the metal matrix, the support portion and/or the molding portion are pre-heated to a temperature comprised between approximately 200° C. and 600° C., the support portion and/or the molding portion are pre-heated, the molding portion being pre-heated to a temperature greater than the temperature of the support portion, the method further comprises a step during which a metal grid is placed between the support portion and the fiber reinforcement and/or between the molding portion and the fiber reinforcement, prior to closing the device, the method further comprises a step of treating the fiber reinforcement adapted to increase the permeability of the fibers forming the fiber reinforcement, the pre-treatment step comprises a step of scouring the fibers forming the fiber reinforcement and a step of chemical treatment by fluoride salts, by carbide deposit or by nickel deposit, and the step of filling the space between the fiber reinforcement and the portions of the device and/or the step of impregnating the fiber reinforcement with the metal matrix are carried out under vacuum.

According to a second aspect, the invention also proposes a part out of a composite material comprising a fiber reinforcement densified by a metal matrix, for example for an aviation engine, characterized in that it is obtained using a manufacturing method described above.

Certain preferred but non-limiting characteristics of the part are the following:

the part comprises an elongated part, for example a plate or a stem, an avionics housing for an engine or a metal reinforcement for a leading edge, the part includes a volume percent of fibers comprised between 30% and 70%, preferably between 40% and 65%, the fiber reinforcement comprises synthetic fibers, the fiber reinforcement comprises carbon fibers, glass fibers, aramid fibers, boron fibers and/or Kevlar® fibers, for example high thermal conductivity modulus carbon fibers, the fiber reinforcement comprises between one and ten superimposed plies of fibers, preferably between two and eight plies, the metal matrix comprises an aluminum alloy and/or a magnesium alloy, and the fiber reinforcement is woven in two dimensions, woven in three dimensions, braided in two dimensions, braided in three dimensions and/or is laminated.

According to a third aspect, the invention also proposes a device for the manufacture of a part as described above, comprising:

a mold, the mold comprising:

a support portion, a molding portion, movable with respect to the support portion so as to delimit with the support portion a recess adapted for receiving a fiber reinforcement, a sealing member, positioned between the support portion and the molding portion, adapted for sealing the mold when the molding portion is attached to the support portion while providing a space between the fiber reinforcement and the portions of the device, and a through opening, formed in the molding portion or in the support portion of the mold and leading into the recess, said through opening being adapted to allow the introduction of a metal matrix into the recess, and an actuator, configured to apply a force to the molding portion and/or to the support portion of the mold so as to bring the molding portion and the support portion together and reduce the space between the fiber reinforcement and the portions of the device, to impregnate the fiber reinforcement with the metal matrix.

According to a fourth aspect, the invention finally proposes a mold for a device as described above characterized in that it comprises:

a support portion, a molding portion, movable with respect to the support portion so as to delimit with the support portion a recess adapted for receiving a fiber reinforcement, a sealing member, positioned between the support portion and the molding portion, adapted for sealing the device when the molding portion is attached to the support portion while providing a space between the fiber reinforcement and the portion of the device, and a through opening, formed in the molding portion or in the support portion and leading into the recess, said through opening being adapted to allow the introduction of a metal matrix into the recess.

According to a preferred but not limiting characteristic, the mold can further comprise a vent leading into the recess and configured to be in fluid communication with a vacuum pump.

BRIEF DESCRIPTION OF THE DRAWINGS

Other characteristics, aims and advantages of the present invention will be clearer upon reading the detailed description that follows, and with reference to the appended drawings given by way of non-limiting examples wherein.

DETAILED DESCRIPTION OF ONE EMBODIMENT

Figure 1:
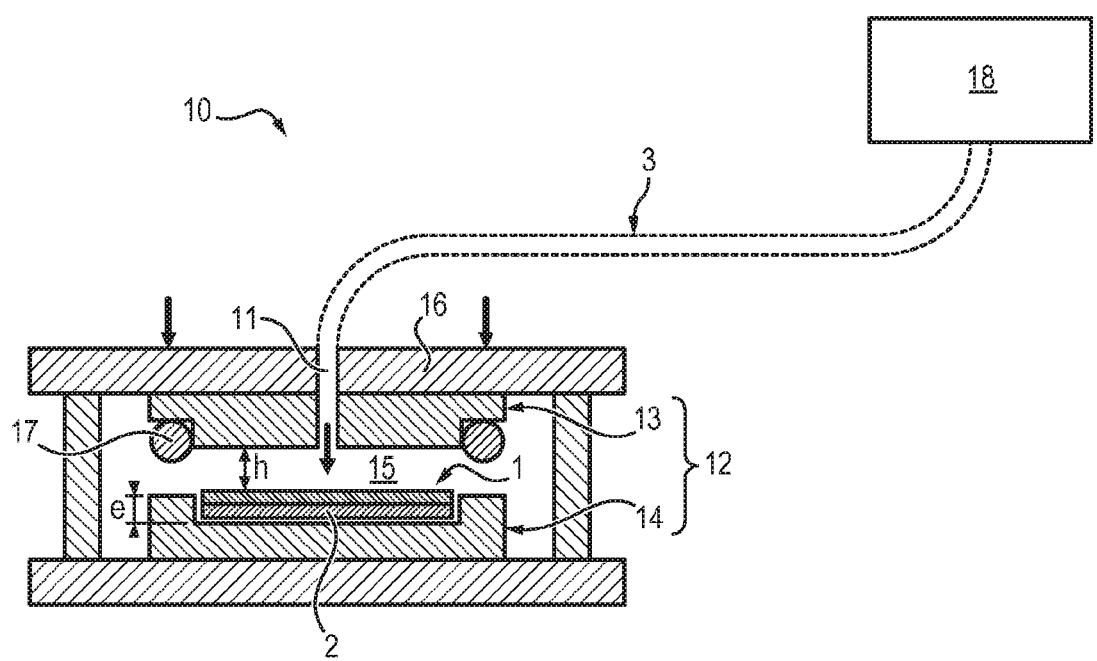
FIG. 1 illustrates an example of a device according to one embodiment of the invention.
Figure 2:
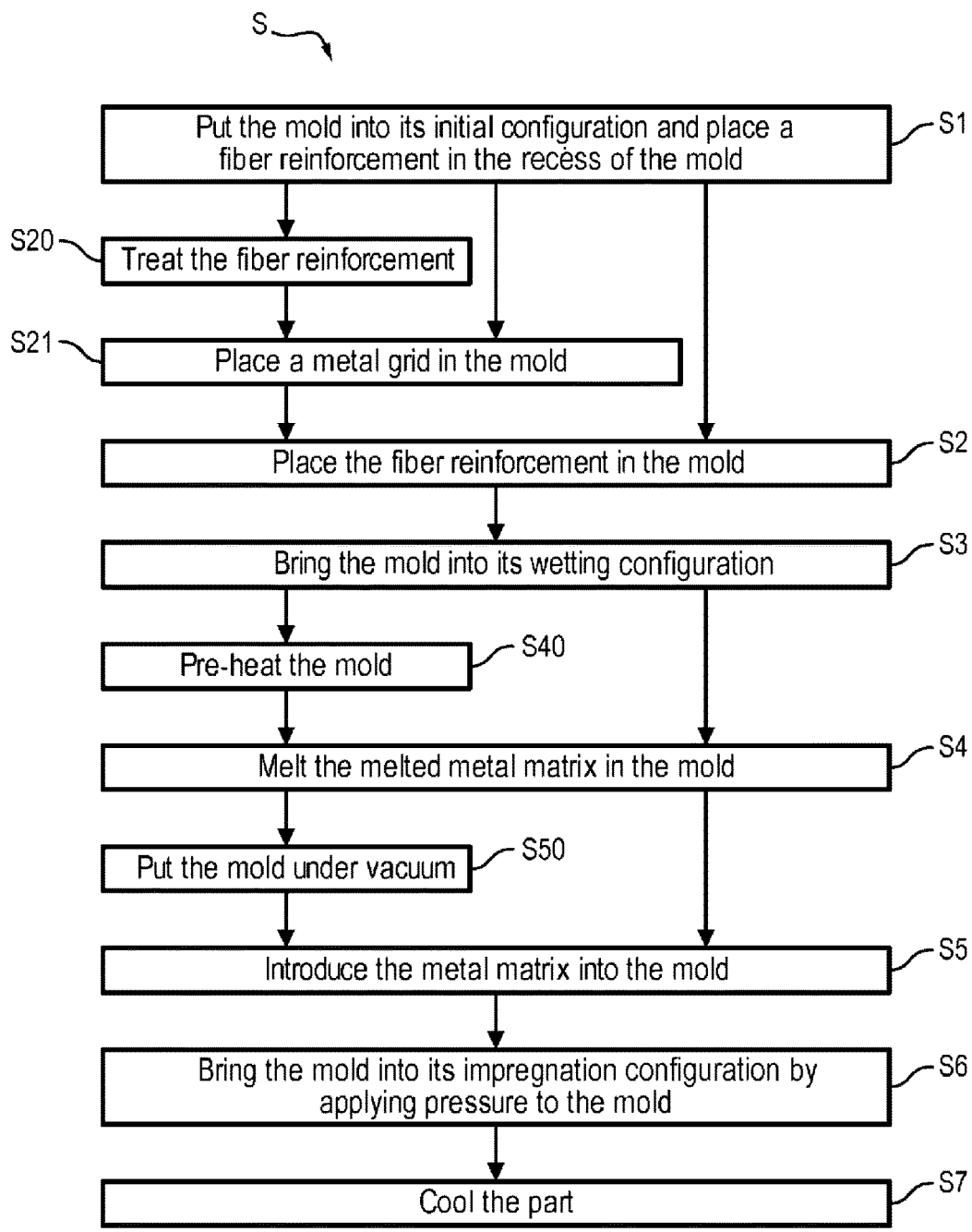
FIG. 2 is a flowchart representing different steps in an embodiment of the manufacturing method according to the invention.

Hereafter, the invention will be more particularly described in its application for the manufacture of a part 1 of a turbine engine, typically of an avionics housing, of a heat sink plate which can be used in such a housing so as to improve heat exchange and cooling of the housing, or a metal reinforcement for a leading edge of a turbine engine vane, configured to protect the leading edge of that vane against the mechanical and thermal stresses to which it is subjected during the operation of the turbine engine.

This is not limiting, however, to the extent that the invention applies to any part 1 which can be obtained in a mold 12 through foundry technique, no matter what its shape (planar, convex, concave, etc.) or its use, to the extent that said part 1 comprises a composite material comprising a fiber reinforcement 2 densified by a metal matrix 3.

What is meant here by a composite material is a material comprising fiber reinforcement 2 densified by a metal matrix 3.

The fiber reinforcement 2 can include any type of fibers adapted for the use contemplated for the part 1. For example, in the case of a part 1 intended to be subjected to a severe temperature environment, the fibers are preferably selected so as to endure such temperatures. In this example, they could be any type of fibers with the exclusion of natural fibers.

For example, in the case of a part 1 of a turbine engine, the fibers can include synthetic fibers such as carbon fibers (e.g. high thermal conductivity modulus carbon fibers such as Pitch (precursor) type fibers, glass fibers, aramid fibers, boron fibers, Kevlar® fibers.

The fiber reinforcement 2 can be woven in two dimensions, woven in three dimensions, braided in two dimensions, braided in three dimensions and/or be laminated (stacking of fiber plies).

So as to improve the mechanical strength of the part 1, the fibers of the fiber reinforcement 2 preferably have sufficient permeability to guarantee good impregnation of the metal alloy 3. This permeability of the fibers can in particular be characterized by their wetting angle. In one embodiment, the wetting angle is nearly 0°, for example between 0° and 60°. For example, a wetting angle on the order of 40° to 50° already makes it possible to ensure good impregnation of the fibers.

If applicable, when the fibers do not have sufficient permeability to ensure good infiltration of the metal alloy 3 into the fiber reinforcement 2, it is possible to have them undergo a prior treatment so as to improve their permeability. This treatment can comprise first of all a step during which the fibers are scoured by heating them to a temperature on the order of 500° C. Depending on the type of fiber, the permeability can remain insufficient, despite this scouring step. For example, the fibers can then have a wetting angle on the order of 150°. In this case, to increase still more the level of permeability of the fibers and reach adapted wetting angles, typically of 40° to 50°, chemical treatments using fluoride salts or by depositing carbide or nickel can be added to the previously scoured fibers.

Moreover, the metal matrix 3 can include any type of alloy adapted to the intended use for the part 1. Thus, for a part 1 requiring at the same time excellent resistance to temperature in a severe environment, good mechanical strength and good electrical conductivity for low bulk, reduced weight and moderate cost, the metal matrix 3 can include an aluminum-based alloy and/or a magnesium-based alloy. This type of alloy can in particular be adapted for a heat sink plate or for an avionics housing as described above.

Other types of metal alloys can be used. These alloys can in particular comprise metals which can be used for sand casting, foundry metals (such as cast iron and steel), metals which can be used for shell molding (gravity, pressure or lost-wax) the melting point whereof is less than 900° C. (alloys of copper, aluminum, zinc, etc.).

Device 10

The method S can be implemented using suitable device 10, comprising a mold 12 having a support portion—or matrix 14—and a molding portion—or punch 13. The punch 13 is movable with respect to the matrix 14 so as to delimit with it a recess 15 adapted for receiving a fiber reinforcement 2. In one embodiment, the facing faces of the matrix 14 and of the punch 13 form the recess 15 and cooperate to shape the part 1 in the mold 12.

The mold 12 further comprises a through opening 11 formed in the punch 13 or the matrix 14 and leading into the recess 15 to allow the introduction of a melted metal alloy 3 into the recess 15. In the embodiment illustrated in FIG. 1, the through opening 11 is formed in the punch 13.

In order to allow the manufacture of a part 1 made of composite material, the mold 12 has:

an initial configuration, wherein the punch 13 is separated from the matrix 14 so as to allow access to the recess 15.

a wetting configuration, wherein the punch 13 is positioned on the matrix 14. In this wetting configuration, the punch 13 and the matrix 14 delimit the recess 15, intended to receive the fiber reinforcement 2. The recess 15 then has an initial internal volume, which corresponds to the volume of the fiber reinforcement 2 used to form the part 1 to which is added a volume of air, between the fiber reinforcement 2 and the mold 12, intended to be filled by the metal alloy 3. In the embodiment illustrated in these figures, the volume of air extends for example between the fiber reinforcement 2 and the punch 13.

an impregnation configuration, wherein the punch 13 and the matrix 14 are brought together so as to reduce the internal volume of the recess 15. In this impregnation configuration, the internal volume of the recess 15 corresponds substantially to the final volume of the part 1.

The mold 12 can further comprise a sealing member 17, positioned between the matrix 14 and the punch 13. The sealing member 17 is configured for sealing the recess 15 of the mold 12 when it is in its wetting configuration or in its impregnation configuration. To this end, the sealing member 17 is selected for sealing the recess 15 of the mold 12 in its wetting configuration and to maintain this sealing when the punch 13 and the matrix 14 are brought into the impregnation configuration, for example by elastic deformation of the sealing member 17. In this manner, a space between the fiber reinforcement 2 and the punch 13 intended to receive the metal alloy 3 in the wetting configuration can be provided while still guaranteeing the sealing of the mold 12.

In one embodiment, the sealing member 17 can comprise a gasket attached to a peripheral zone of the punch 13 (respectively of the matrix 14) intended to come into contact with the matrix 14 (respectively the punch 13) when the mold 12 is closed. The gasket 17 can in particular comprise a relatively ductile metal gasket so as to allow closure of the mold 12, which dilates when the temperature of the mold 12 increases and thus allows sealing the mold 12. As a variant, the gasket 17 can be an O-ring attached to the matrix 14 (respectively the punch 13) in such a manner that, when the punch 13 is applied to the matrix 14 to close the mold 12, the punch 13 (respectively the matrix 14) comes into contact with the O-ring and compresses it, thus sealing the recess 15 of the mold 12.

Optionally, the mold 12 can also comprise a pre-heating member, configured to pre-heat the mold 12 to a temperature defined in terms of the melting temperature of the metal alloy 3 so as to avoid thermal gradients with the metal alloy 3 during its introduction into the mold 12. This pre-heating member can then be independent of the device 10 so as to make the mold 12 autonomous in terms of thermal control.

Finally, the device 10 can comprise an actuator 16, configured to apply a force to the punch 13 and/or to the matrix 14 so as to bring the punch 13 and the matrix 14 together and to reduce the space between the fiber reinforcement 2 and the mold 12, to impregnate the fiber reinforcement 2 with the metal alloy 3.

The actuator 16 can be an integral part of the mold 12 or be separated from it. The variant embodiment in which the mold 12 is distinct from the actuator 16 has the advantage of allowing the manufacture of several parts 1 in series with the same actuator 16 by using several different molds 12, independently of the duration of cooling the parts 1 in the mold 12.

In one embodiment, the actuator 16 can in particular comprise a press capable of applying a pressure of up to 2000 tons. The pressure applied will of course be adapted to the size and to the dimensions of the device.

The invention will be illustrated here for the case of producing a part 1 comprising a heat-sink plate made of composite material comprising a fiber reinforcement 2 densified by a metal alloy 3. A person skilled in the art will then know how to adapt, without excessive effort, the steps of the method S for producing other parts 1 made of composite material.

In this example, the heat-sink plate made of composite material comprises a parallel first face and second face linked together by lateral edges. Here, the first face and the second face correspond to the faces of the parallelepiped with the largest surface area.

The recess 15 delimited by the matrix 14 and the punch 13 then has an overall parallelepiped shape. Consequently, the matrix 14 and the punch 13 each have an open cavity the contour whereof is generally of parallelepiped shape, said cavities forming together the recess 15 of the mold 12 when the matrix 14 and the punch 13 are assembled. As a variant, only the matrix 14 (respectively the punch 13) can comprise such a cavity, the punch 13 (respectively the matrix 14) then being planar.

In one embodiment, the cavity of the matrix 14 comprises a first wall corresponding to the first surface of the plate to be produced, the cavity of the punch 13 comprises a second wall corresponding to the second surface, the first wall and the second wall extending facing one another and parallel when the mold 12 is closed. In other words, the cavities each have a main direction of extension substantially perpendicular to the direction of displacement of the punch 13 with respect to the matrix 14, which makes it possible to optimize the distribution of the metal alloy 3 within the fiber reinforcement 2 and to homogenize the forces applied to the largest surfaces of the part 1.

In the case of a part 1 having a different shape from that of a plate, it will be understood that the shape of the matrix 14 and the shape of the punch 13 must be adapted. Thus, by way of comparison, for a housing with an overall rectangular shape, the matrix 14 can for example comprise a cavity the contour whereof is a parallelepiped overall, while the punch 13 comprises a complementary protruding shape configured to penetrate into the cavity of the matrix 14.

Manufacturing Method S

So as to produce a part 1 made of a composite material, the method S of the invention comprises a first step S1 during which the mold 12 is open to be brought into its initial configuration, by separating the matrix 14 from the punch 13 so as to open the recess 15.

During a second step S2, the fiber reinforcement 2 intended to form the part 1 is placed in the recess 15 of the mold 12, on the matrix 14.

If applicable, the fiber reinforcement 2 can be pre-treated (step S20) so as to modify its permeability and improve the impregnation of the metal alloy 3.

In the example of a heat-sink plate, the fibrous reinforcement 2 can have an overall parallelepiped shape. Moreover, the fiber reinforcement 2 can comprise several superimposed plies of fibers, typically between one and ten plies of fibers, preferably between two and eight plies of fibers, typically four to eight plies of fibers. Moreover, so as to make the plate thermally and electrically conductive, the plies can comprise carbon fibers.

In one embodiment, a metal grid can be placed between the punch 13 and the fiber reinforcement 2 (step S21), and if applicable between the matrix 14 and the fiber reinforcement 2. The purpose of this metal grid is to homogenize the distribution of the metal alloy 3 on and in the fiber reinforcement 2 by creating an open surface which limits the forces likely to hinder the circulation of the melted alloy, which facilitates the progression of the melted alloy around the fiber reinforcement 2.

During a third step S3, the device 10 can be brought to its wetting configuration by applying the punch 13 to the matrix 14 so as to close the recess 15. In one embodiment, the device 10 is sealingly closed so as to prevent any loss of material outside the mold 12.

The sealing of the closed mold 12 can be obtained using the sealing member.

In the wetting configuration, the mold 12 is close in such a manner that a space is provided between the fiber reinforcement 2 and the mold 12, while ensuring the sealing of the mold 12. The volume of this internal space corresponds to the volume of the metal alloy 3 that it is desired to impregnate into the fiber reinforcement 2, so as to form the part 1 made of composite material. This volume corresponds overall to the internal volume of the fiber reinforcement 2, i.e. to the volume of air present between the fibers of the reinforcement.

Generally, the height h is comprised between a few tenths of millimeters for a thickness e comprised between 1 and 2 mm and a few millimeters for a thickness e greater than 2 mm. For example, for a fiber reinforcement 2 having a thickness e (the dimension along the axis of application of force by the actuator 16) of approximately two millimeters, the space between the upper surface of the fiber reinforcement 2 and the punch 13 has a height h (the dimension along the axis of application of force by the actuator 16) on the order of one millimeter.

It will of course be understood that the volume of the space depends on the percentage of fibers that it is desired to obtain for the part 1. For example, the part 1 can include between 30% and 70% of the metal matrix 3 for 70% to 30% of fibers (i.e. a volume percentage of fibers of 30 to 70%), preferably between 35% and 60% by weight of metal matrix 3 for 65% to 40% (i.e. a volume percent of fibers from 40 to 65%).

During a fourth step S4, the metal alloy 3 is heated in a suitable container 18 until it reaches its melting temperature, so as to allow its introduction into the mold 12 in liquid form.

In one variant embodiment, the punch 13 and/or the matrix 14 are pre-heated S40 so as to limit thermal gradients and avoid a possible shock which could modify the metallurgical quality of the obtained part 1. For example, the punch 13 and/or the matrix 14 can be pre-heated to temperature comprised between 200° C. and 600° C. The pre-heating temperature can, if applicable, be adapted to the melting temperature of the metal alloy 3. Thus, for an aluminum- or magnesium-based alloy, the punch 13 and/or the matrix 14 can be pre-heated to a temperature on the order of 500° C.

The pre-heating S40 of the mold 12 can be carried out in the conventional manner, by induction for example.

In one variant embodiment, the pre-heating S40 of the mold 12 (punch 13 and/or matrix 14) can be carried out prior to the introduction of the fiber reinforcement 2 into the mold 12, i.e. prior to the second step S2 of the method S.

During a fifth step S5, the metal alloy 3 is introduced into the closed mold 12 by the through opening 11.

In a first embodiment, the metal alloy 3 penetrates by gravity into the mold 12. Its distribution on and in the fiber reinforcement 2 can be improved, optionally, by the metal grid. The mold 12 is then at atmospheric pressure.

As a variant, the mold 12 can be put under vacuum S50 so as to improve the distribution of the metal alloy 3 in the fiber reinforcement 2 and avoid the formation of bubbles, particularly when the fiber reinforcement 2 has considerable thickness or the subsequent use of the part 1 requires excellent mechanical performance. For example, the internal cavity of the mold 12 can be brought to a pressure on the order of 20 bars. To this end, the mold 12 can then comprise a vent (not illustrated in the figures) leading into the recess 15 of the mold 12 and in fluid communication with a pump configured to put the mold 12 under vacuum.

Following this step S5, the mold 12 then contains the fiber reinforcement 2, if applicable a metal grid on and/or under the fiber reinforcement 2 and melted metal alloy 3 distributed around the fiber reinforcement 2.

During a sixth step S6, a force is applied by means of an actuator 16 to the mold 12 (i.e. to the punch 13 and/or the matrix 14) so as to bring the mold 12 into its impregnation configuration by bringing the punch 13 and the matrix 14 together. This bringing of the punch 13 and the matrix 14 together has the effect of forcing the metal alloy 3 to infiltrate into the interstices of the fiber reinforcement 2 by reducing the internal volume of the recess 15 of the mold 12.

The force can be applied by the actuator 16 in a direction substantially perpendicular to a main plane of extension of the fiber reinforcement 2. Typically, for a part 1 comprising a plate which extends generally in an extension plane, it is possible to apply a force along a direction normal to this extension plane. The force applied by the actuator 16 is then more homogeneous than when it is applied along an axis comprised within the extension plane, and thus makes it possible to impregnate more homogeneously the metal alloy 3 into the fiber reinforcement 2.

Preferably, steps S5 and S6 are accomplished sufficiently rapidly that the impregnation of the fiber reinforcement 2 by the metal alloy 3 using the actuator 16 is finished before the metal alloy 3 begins to harden.

Moreover, step S6 of impregnating the fiber reinforcement 2 with the metal alloy 3 can be carried out, optionally, under vacuum.

Following this step S6, the metal alloy 3 is impregnated homogeneously into the fiber reinforcement 2.

During a seventh stage S7, the part 1 is cooled. Cooling can take place in the open air in the device 10. For example, the mold 12 can be extracted from the device 10, then allowed to cool while a different mold 12 is used in the device 10 for the production of another part 1.

Of course it will be understood that the cooling method of the part 1 is selected based on the metallurgical quality that it is desired to obtain for the part 1. If applicable, it is for example possible to carry out tempering of the part 1.

Following cooling step S7, the metal alloy 3 is distributed homogenously in the fiber reinforcement 2, which bestows on the part 1 thus obtained good mechanical properties, and thermal and conductive properties can be adjusted depending on the material used for the metal alloy 3. In particular, the invention makes it possible to generate a network of electrical and thermal bridges through a fiber reinforcement 2 so as to dissipate and/or conduct energy through the obtained part 1, by minimizing contact resistances between the fibers of the fiber reinforcement 2 and the metal alloy 3 so as to optimize flow passages.

Finally, the part 1 can undergo finishing steps such as machining, riveting, gluing, welding, etc.

The invention claimed is:

1. A method for manufacturing a part out of a composite material comprising a fiber reinforcement densified by a metal matrix, the manufacturing method comprising:
   placing a fiber reinforcement in a device in an open configuration, wherein the device comprises a support portion and a molding portion, wherein the support portion is separated from the molding portion in the open configuration;
   sealingly closing the device such that the device is in a first closed configuration, wherein the molding portion is in contact with the support portion in the first closed configuration, wherein a first volume is defined by and between the molding portion and the support portion in the first closed configuration, the fiber reinforcement being disposed in the first volume,
   melting a metallic material,
   introducing the melted metallic material into the first volume from an exterior of the first volume when the device is in the first closed configuration, and
   applying a force to the molding portion and/or to the support portion such that the device transitions to a second closed configuration having a second volume defined by and between the molding portion and the support portion such that the fiber reinforcement with the metallic material is impregnated with the metallic material, wherein the second volume is less than the first volume.

2. The manufacturing method according to claim 1, further comprising pre-heating the support portion and/or the molding portion to a pre-heating temperature less than or equal to a melting temperature of the metallic material.

3. The manufacturing method according to claim 2, wherein pre-heating the support portion and/or the molding portion comprises pre-heating the molding portion to a temperature greater than a temperature of the support portion.

4. The manufacturing method according to claim 1, further comprising placing a metal grid in the device in the open configuration, the metal grid located between the support portion and the fiber reinforcement and/or between the molding portion and the fiber reinforcement.

5. The manufacturing method according to claim 1, further comprising treating the fiber reinforcement so as to increase permeability of fibers forming the fiber reinforcement.

6. The manufacturing method according to claim 5, wherein treating the fiber reinforcement comprises scouring the fibers forming the fiber reinforcement and, after scouring the fibers, chemically treating the fibers using fluoride salts or depositing a carbide or nickel on the fibers.

7. The manufacturing method according to claim 1, wherein introducing the metallic material into the first volume and impregnating the fiber reinforcement with the metallic material are carried out under vacuum.

8. The manufacturing method according to claim 1, wherein at least one of the support portion and the molding portion are pre-heated to a pre-heating temperature between approximately 200° C. and 600° C.

9. The manufacturing method according to claim 1, wherein the first volume is equal to a sum of a volume of the fiber reinforcement and a volume of the metallic material, and wherein the second volume is equal to a final volume of the part formed by the manufacturing method.

10. The manufacturing method according to claim 1, wherein introducing the melted metallic material into the first volume comprises introducing a volume of the melted metallic material that is equal to a volume of an internal volume of the fiber reinforcement.

* * * * *